United States Patent
Razumkov et al.

(10) Patent No.: US 10,957,055 B2
(45) Date of Patent: Mar. 23, 2021

(54) METHODS AND SYSTEMS OF SEARCHING FOR AN OBJECT IN A VIDEO STREAM

(71) Applicant: OBSCHESTVO S OGRANICHENNOI OTVETSTVENNOSTYU "SATELLIT INNOVATSIA", Perm (RU)

(72) Inventors: Artem Vladimirovich Razumkov, Perm (RU); Alexandr Vladimirovich Korobkov, Perm (RU); Petr Vladimirovich Kharebov, Perm (RU); Alexey Georgievich Yastrebov, Perm (RU); Alexandr Anatolievich Nevelsky, Perm (RU); Konstantin Alekseevich Gavrilov, Perm (RU); Andrey Viktorovich Durakov, Perm (RU); Aleksey Yurievich Gorodilov, Perm (RU); Alexei Georgievich Kraev, Perm (RU); Andrey Valerievich Zayakin, Perm (RU)

(73) Assignee: OBSCHESTVO S OGRANICHENNOI OTVETSTVENNOSTYU "SATELLIT INNOVATSIA", Perm (RU)

( * ) Notice: Subject to any disclaimer, the term of this patent is extended or adjusted under 35 U.S.C. 154(b) by 101 days.

(21) Appl. No.: 16/311,928

(22) PCT Filed: Dec. 27, 2016

(86) PCT No.: PCT/RU2016/000934
§ 371 (c)(1),
(2) Date: Dec. 20, 2018

(87) PCT Pub. No.: WO2017/222413
PCT Pub. Date: Dec. 28, 2017

(65) Prior Publication Data
US 2019/0180456 A1 Jun. 13, 2019

(30) Foreign Application Priority Data
Jun. 20, 2016 (RU) .......................... RU2016124320

(51) Int. Cl.
*G06T 7/292* (2017.01)
*G06T 7/00* (2017.01)
(Continued)

(52) U.S. Cl.
CPC ................ *G06T 7/292* (2017.01); *G06K 9/46* (2013.01); *G06K 9/6215* (2013.01);
(Continued)

(58) Field of Classification Search
CPC .......... G06T 7/292; G06T 7/00; G06T 7/246; G06K 9/46; G06K 9/6215; G06K 9/6218;
(Continued)

(56) References Cited

U.S. PATENT DOCUMENTS 8,520,899 B2 * 8/2013 Brown ............... G06K 9/00369
348/169
8,891,880 B2 11/2014 Oami et al.
(Continued)

FOREIGN PATENT DOCUMENTS

RU 2 370 817 10/2009
RU 2 531 876 10/2014

OTHER PUBLICATIONS

"Video analytics: tasks and solutions", Network Solutions Magazine, LAN, Open Systems Publishers, http://www.osp.ru/lan/2014/06/13041879/, retrieved Dec. 20, 2018, 27 pages.
(Continued)

*Primary Examiner* — Jerome Grant, II (74) *Attorney, Agent, or Firm* — Nixon & Vanderhye PC (57) ABSTRACT

The claimed invention relates to the data processing industry, in particular, to the methods and systems of searching and analyzing data for finding an object in a video stream. The technical result is enhancing the precision of determining the sought object in a video stream, as well as increasing the speed of locating the object by means of performing a classification of objects and determining their features present on the video stream frames.

20 Claims, 6 Drawing Sheets

(51) Int. Cl.
  *G06K 9/46* (2006.01)
  *G06T 7/246* (2017.01)
  *G06K 9/62* (2006.01)
  *H04N 7/18* (2006.01)

(52) U.S. Cl.
  CPC ......... *G06K 9/6218* (2013.01); *G06K 9/6228* (2013.01); *G06K 9/6261* (2013.01); *G06K 9/6267* (2013.01); *G06T 7/00* (2013.01); *G06T 7/246* (2017.01); *H04N 7/18* (2013.01)

(58) Field of Classification Search
  CPC .. G06K 9/6228; G06K 9/6261; G06K 9/6267; G06K 9/00744; G06K 9/00771; G06K 9/00362; H04N 7/18
  USPC ........................................................ 382/103
  See application file for complete search history.

(56) References Cited

U.S. PATENT DOCUMENTS

| | | | |
|---|---|---|---|
| 2009/0110277 A1* | 4/2009 | Birtles | G06F 16/583 382/173 |
| 2009/0219387 A1* | 9/2009 | Marman | G06K 9/4604 348/143 |
| 2010/0316287 A1* | 12/2010 | Duong | G06K 9/342 382/164 |
| 2011/0051999 A1* | 3/2011 | Tu | G06K 9/6256 382/103 |
| 2012/0250979 A1* | 10/2012 | Yokoyama | G06T 7/593 382/154 |
| 2013/0166711 A1 | 6/2013 | Wang et al. | |
| 2013/0201330 A1* | 8/2013 | Thornton | H04N 7/18 348/143 |
| 2014/0286568 A1* | 9/2014 | Saruta | G06K 9/6211 382/159 |
| 2015/0178552 A1 | 6/2015 | Nielsen et al. | |
| 2016/0165193 A1* | 6/2016 | Rasheed | G08B 13/19671 348/143 |
| 2017/0286752 A1* | 10/2017 | Gusarov | G06T 13/40 |

OTHER PUBLICATIONS

"Macroscop interchamber tracking — building an object trajectory using several IP cameras of the system", Macroscop, retrieved Dec. 20, 2018, http://macroscop.com/o-kompanii/novosti/2013/mezhkamernyij-treking-macroscop-postroenie-traektorii-obekta-po-neskolkim-ip-kameram-sistemyi.html, 9 pages.

International Search Report for PCT/RU2016/000934, dated Apr. 20, 2017, 5 pages.

* cited by examiner

METHODS AND SYSTEMS OF SEARCHING FOR AN OBJECT IN A VIDEO STREAM

This application is the U.S. national phase of International Application No. PCT/RU2016/000934 filed Dec. 27, 2016 which designated the U.S. and claims priority to RU 2016124320 filed Jun. 20, 2016, the entire contents of each of which are hereby incorporated by reference.

TECHNICAL FIELD

The claimed invention relates to the data processing industry, in particular, to the methods and systems of searching and analyzing data for finding an object in a video stream.

PRIOR ART

There exists a system of automatic separation and tracking of human face (RU 2370817, SAMSUNG ELECTRONICS Co, Ltd., Oct. 20, 2009). The system allows to perform identification of a person by analyzing video data recorded to the archive of a CCTV system, and to track a specific person across various cameras.

A disadvantage of the abovementioned method is the demanding requirements to image quality and shooting conditions of each camera for which the analysis is being performed, because the subject's characteristics are the features of a human face which thus must always be visible in a certain perspective and with a sufficient resolution. Such requirements significantly limit the range of applications of the referred invention for searching for people in the CCTV systems' database.

There is a method of indexing video data with the help of a map, which allows to accelerate search for data in a video archive by setting object search area coordinates, or acquire object movement trajectory in a two-dimensional space (RU 2531876, Synesis Limited Liability Company, Oct. 27, 2014). The method is based on determining interrelations between the image of a moving object and the position and/or parameters of the trajectory of the acquired object on the map, calculated by comparing the object's images received from two different cameras.

The disadvantage of the described method lies in the impossibility of searching for an object by its color characteristics; the objects are not divided into classes, so it is impossible to set an object class as a search parameter, for example, find all persons in the video stream of a given camera. The requirement to have two cameras shooting the same place from the different angles increases the system complexity and makes it more resource-demanding.

The method closest to the claimed invention is described in the U.S. Pat. No. 8,891,880 patent (Nec Corp., Nov. 18, 2014). This method allows to track a person in a video stream even if he/she does not possess significant distinctive features, for example, when the archive contains a large number of people wearing similar clothes. The method uses facial features and characteristics of a person's clothes as the main distinctive features. The similarity of the persons' images is determined using a combination of features acquired in the course of face identification and parts of clothes analysis. It poses requirements on the image quality; in addition, the availability of the object's characteristics depends on the shooting angle at the given moment.

DISCLOSURE OF INVENTION

The technical problem to be solved by the given invention is the creation of an efficient method of automatic search for an object on the images being received from various cameras or previously recorded to a CCTV system archive using the specified features of such object.

The technical result is enhancing the precision of determining the sought object in a video stream, as well as increasing the speed of locating the object by means of performing a classification of objects and determining their features present on the video stream frames.

In the first preferred version of the implementation of the claimed invention, a method of searching for an object in the video stream is revealed. It contains the stages during which:
  a video sequence is obtained;
  at least one zone of interest is determined on at least one of the mentioned video frames, provided that the mentioned zone of interest contains at least one image of the object;
  one or more images of the object are determined on the mentioned zone of interest and their classification is performed, in the course of which the comparison is performed of one or more identified object images in the frame with at least one set object class;
  the processing of all the identified object images in the given zone of interest is performed, during which the identified object images are separated from the background of a frame;
  the topology of one or more identified object images in the given zone of interest is created, wherein the topology includes the elements characterizing the object's structure and the features of such elements;
  the feature set is created for each of the mentioned object images (one or more) according to the created topology, and is saved in the data storage with a reference to the specific mentioned object image;
  the search criteria is set, containing information about one or more characteristics of the object of search, or the graphic representation of the sample for searching;
  the features of the sought object are obtained from the mentioned search criterion, and a search subject is created on the basis of the specified features;
  the search for objects in a video stream is performed on the basis of the mentioned features indicative of the object of search and obtained from the search criterion;
  the mentioned object of search is compared with the features of the images of the objects found in the video stream;
  the frame and/or set of frames containing the mentioned images of the objects corresponding with the object of search are determined, or it is announced that the search produced no results;
  the search results are provided.

In one particular case, the sequence of video frames is received from the data storage or from one or more cameras in surveillance mode.

In another particular case, the zone of interest is set manually by the user, or is created when there is movement in the frame.

In yet another particular case, in the presence of motion in the frame the zone of interest is created for each moving object in the frame.

In another particular case, the procedure of separating the image from the background includes dividing an area of the image into the groups of pixels which belong to the image of the object being processed and to the background.

In another particular case, the features of the topology elements are spatial and color characteristics which are color clusters.

In yet another particular case, the groups of pixels belonging to the background are not considered when building clusters.

In another particular case, the clusters are determined for each part of the object's structure.

In another particular case, each color cluster includes one or more attributes selected from a group: position of the center in relation to the object, size of cluster in relation to the object as a whole, average color, part of the object to which the cluster corresponds, or their aggregate.

In yet another particular case, the time of fixation of at least one object in the frame and the identification number of the camera from which the specific frame was received is determined.

In another particular case, the information contained in the search criterion includes the following: color of the object or of its part.

In another particular case, the selection of the object's image as a sample for search criterion is performed by selecting an area in the frame.

In another particular case, the object image is selected from an external data storage to be used as a sample in the capacity of a search criterion.

In another particular case, in the course of the search for the object's image according to the entered search criteria the degree of similarity of the objects is calculated based in the features of the objects contained in the data storage.

In another particular case, the degree of similarity is determined by comparing color clusters of the search object and the analyzed object in the frame.

In another particular case, the degree of similarity of the clusters' color is determined with the help of the classification of the cluster's color into one or several color classes.

In another particular case, during the classification stage, the images of the objects not belonging to any known class are considered as unknown objects.

In another particular case, a simplified topology is built for the unknown detected objects.

In the second preferred option of the implementation of the claimed invention, a method of searching for an object in the video stream is being revealed. The above-mentioned method consists of the stages in the course of which the following is performed:
  a sequence of video frames from two or more cameras is obtained;
  at least one zone of interest is determined on at least one of the mentioned video frames, provided that the mentioned zone of interest contains at least one image of the object;
  one or more images of the object are determined on the mentioned zone of interest and their classification is performed, in the course of which the comparison is made of one or more identified object images in the frame with at least one set object class;
  the processing of all the identified object images in the given zone of interest is performed, during which the identified object images are separated from the background of a frame;
  the topology of one or more identified object images in the given zone of interest is created, wherein the topology includes the elements characterizing the object's structure and the features of such elements;
  the feature set is created for each of the mentioned object images (one or more) according to the created topology, and is saved in the data storage with a reference to the specific mentioned object image;
  the object image is chosen as a tracking subject;
  the search according to the mentioned video frame sequence is performed in order to locate the frames that contain the mentioned tracking subject image by comparing the features of the mentioned tracking object image with features of the object images kept in the specified data storage;
  The sequence of frames containing the image of the specified object is determined;
  The search result is displayed.

In a particular case, at least one video camera is additionally determined on which the image of the tracked object is registered.

In another particular case, the object movement trajectory is determined and displayed on a site plan.

In another particular case, the spatial location of cameras is taken into consideration in the course of finding a tracked object.

In another particular case, the user can set a sample as an object of tracking by selecting the object in the frame received from a camera.

In yet another particular case, the automatic changeover of cameras is performed to display the search results.

In the third preferred option of implementation of the claimed invention, the system of searching for an object in a video stream is detailed. The said system contains at least one means of storing and processing the video frames, connected with at least one processor and one data storage, whereby the mentioned data storage contains machine-readable commands, which, in the course of their execution by at least one processor, carry out the stages of the method in question, during which:
  the sequence of video frames is received from the mentioned means of storage and video frame processing;
  at least one zone of interest on at least one specified video frame is determined, provided that the mentioned zone of interest contains at least one object image;
  one or more images of the object are determined on the mentioned zone of interest and their classification is performed, in the course of which the comparison is made of one or more identified object images in the frame with at least one object class;
  the processing of all the identified object images in the given zone of interest is performed, during which the identified object images are separated from the background of a frame;
  the topology of one or more identified object images in the given zone of interest is created, wherein the topology includes the elements characterizing the object's structure and the features of such elements;
  the feature set is created for each of the mentioned object images (one or more) according to the created topology, and is saved in the data storage with a reference to the specific mentioned object image;
  the search criteria is set, containing information about one or more characteristics of the object of search, or the graphic representation of the sample for searching;
  the features of the sought object are obtained from the mentioned search criterion, and a search subject is created on the basis of the given features;
  the search for objects in a video stream is performed on the basis of the mentioned features indicative of the object of search and obtained from the search criterion;
  the mentioned object of search is compared with the features of the images of the objects found in the video stream;

the frame and/or set of frames containing the mentioned images of the objects corresponding with the object of search are determined, or it is announced that the search produced no results;

the search results are provided.

In one particular case, at least one means of storage and processing of video frames is connected with at least one surveillance camera.

In another particular case, the surveillance cameras are IP, fixed, or PTZ cameras.

In the fourth preferred option of implementation of the claimed invention, the system containing a group of surveillance cameras and used for searching for an object in a video stream is described. The said system is linked with at least one means of storing and processing the video frames, connected with at least one processor and one data storage, whereby the mentioned data storage contains machine-readable commands, which, in the course of their execution by at least one processor, carry out the stages of the method in question, during which:

the sequence of video frames is received from two or more video cameras;

at least one zone of interest on at least one specified video frame is determined, provided that the mentioned zone of interest contains at least one object image;

one or more images of the object are determined on the mentioned zone of interest and their classification is performed, in the course of which the comparison is made of one or more identified object images in the frame with at least one object class;

the processing of all the identified object images in the given zone of interest is performed, during which the identified object images are separated from the background of a frame;

the topology of one or more identified object images in the given zone of interest is created, wherein the topology includes the elements characterizing the object's structure and the features of such elements;

the feature set is created for one or more object images according to the created topology for each object, and is saved in the data storage with a reference to the specific mentioned object image;

the object image is chosen as a subject for tracking;

the search using the mentioned video frame sequence is performed in order to determine the frames containing the specified tracked object image by comparing the features of the mentioned tracked object image with the features of the object images stored in the specified data storage;

the sequence of frames containing the image of the specified tracked object is determined;

the search result is displayed.

In one particular case, the video frame storage and processing means is a server.

In another particular case, the server is a cloud server.

In another particular case, the video surveillance cameras are IP cameras.

In another particular case, the cameras are linked with the means of storage and processing of the video frames thru wired or wireless data transmission channel.

In yet another particular case, at least one camera on which the sought object image has been detected is determined.

IMPLEMENTATION OF INVENTION

Figure 1:
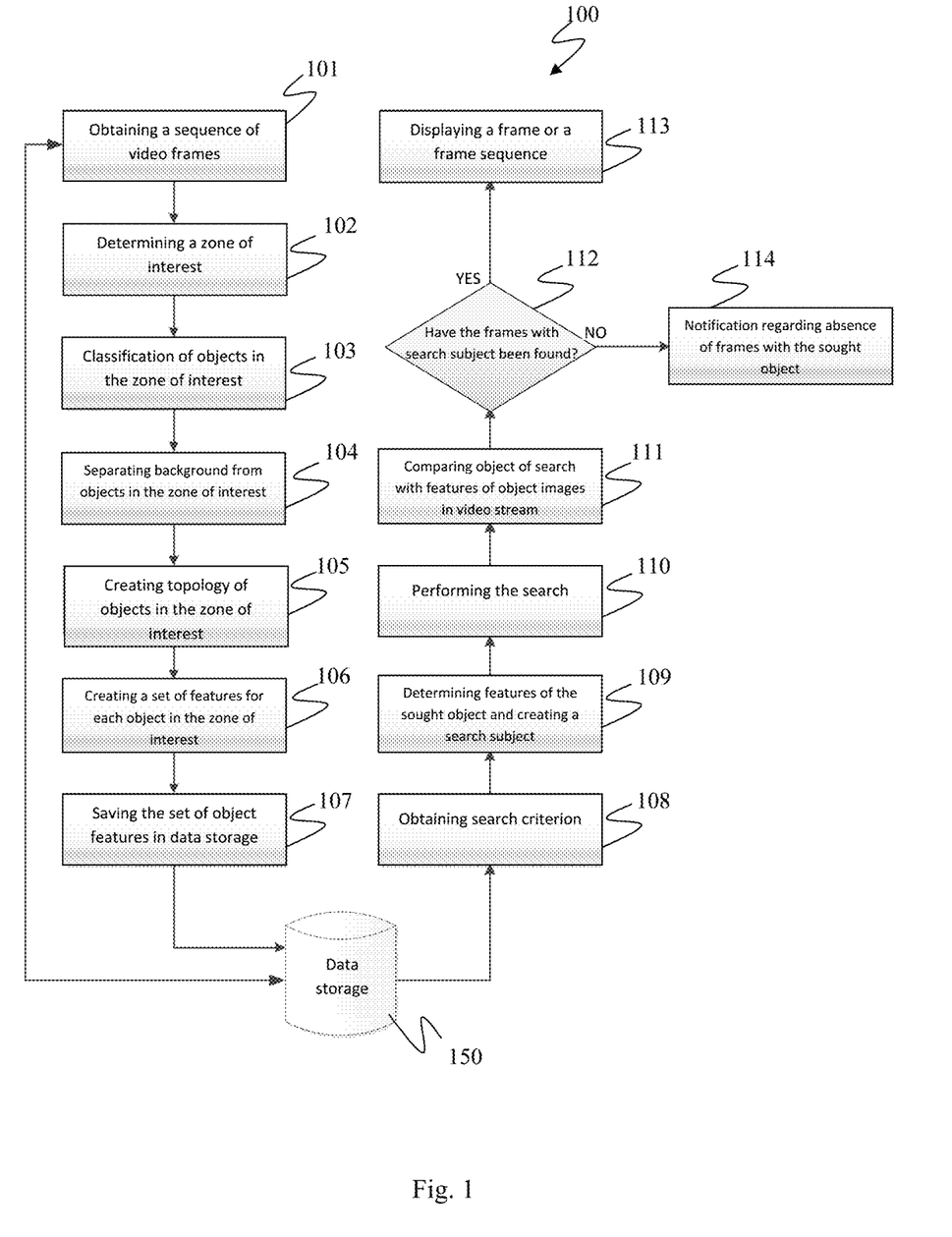
FIG. 1 illustrates the step sequence of method implementation according to the first implementation option.

FIG. 1 shows Method 100 of determining an object in the video stream in accordance with the first option of the claimed invention.

At Stage 101, the data search system obtains the video sequence from the Data Storage 150. The data storage 150 can be organized on the basis of widely used computers, for example, a PC, a supercomputer or a mainframe computer, making use of the standard data storage means like HDD, SSD, NAND Flash, etc.

The information entering the data storage 150 may be received from the sources of video recording, for example, from cameras (video cameras) (surveillance cameras, IP cameras of fixed or PTZ type, etc.), or transmitted from some external source of data, for example, a different data storage or electronic device. The data constitutes the static frames recorded with the help of the above-mentioned means of video recording, or the video sequence recorded with the help of the specified means. Each frame is a two-dimensional pixel array. This array has a certain size called frame resolution.

The frames are shown as bitmap images in the form of a two-dimensional pixel array or the average colors of blocks of pixels, with the size of W×H, where W is the image width, and H is the image height. The pixels or blocks of pixels of the image have a color the value of which is saved as the values of components of a certain color space, for example, RGB. At stage 102, one or more zones of interest 120 are selected on the obtained sequence of video frame (hereinafter video sequence) (FIG. 2, FIG. 3), where the objects of specified types 1201, 1202 are being detected. Selection of the zones of interest 120 allows to reduce computation effort required for the input data processing.

Figure 2:
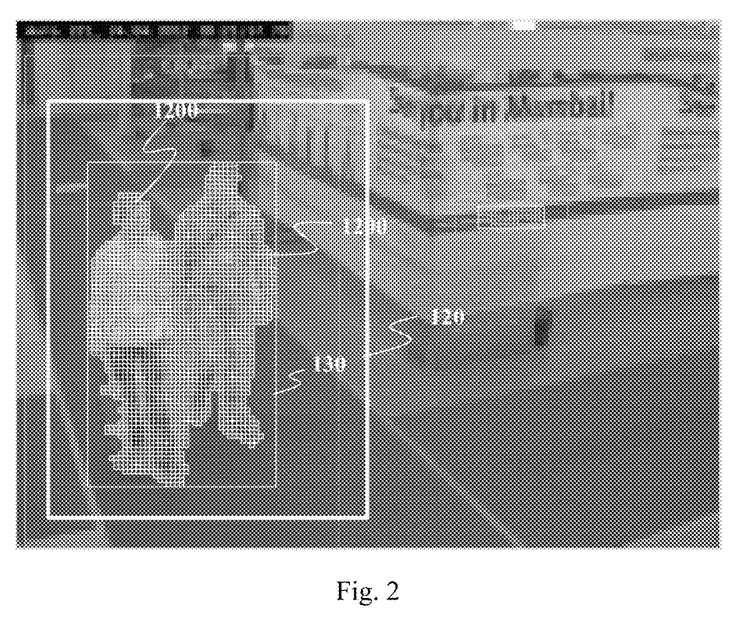
FIGS. 2 and 3 illustrate the example of zone of interest.
Figure 3:
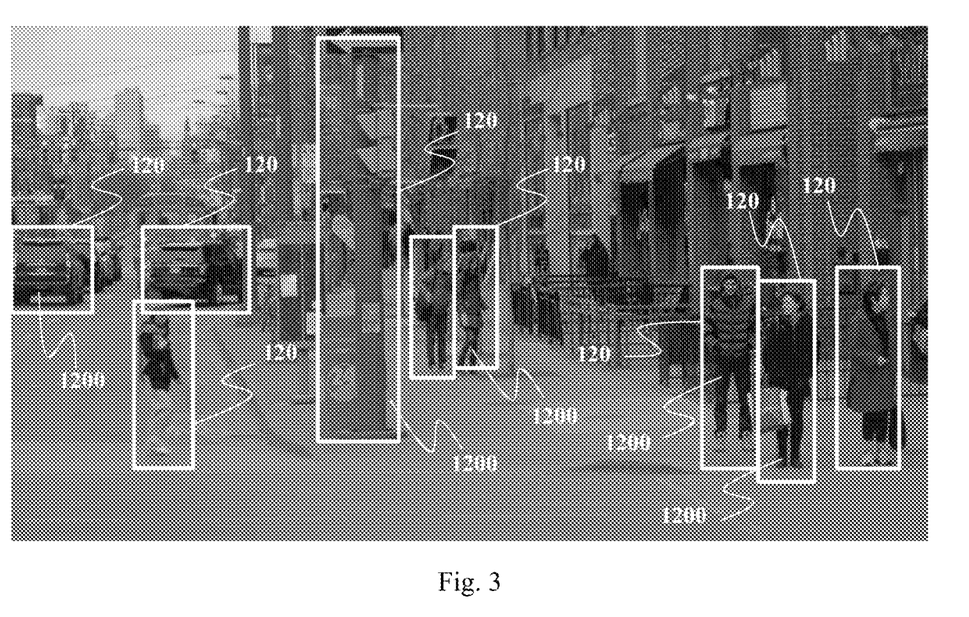

The zone of interest 120 can represent a part of the frame and contain one or more object images 1200. The zone of interest 120 can also represent the whole frame, in which case all the object images in the frame will be subsequently processed by the system.

The zone of interest 120 can be set by a user of the CCTV system or by a person working with the information stored in the data storage 150, or it can be automatically determined by the presence of movement in the frame, or by some other means, whereby one zone of interest 120 can be created for several object images 1200 (FIG. 2) contained in it, or for each object image 1200 individually (FIG. 3).

In the course of creating zones of interest during the movement of object 1200 in the frame, the frame sequence is processed by the motion detector which selects zones 130 in each frame; these zones consist of the arrays of linked pixels and are associated with objects 1200 that were moving in the frame. Each such array corresponds to a separate moving object 1200, whereas each moving object 1200 can contain many individual objects. The zone 130 which includes the given pixel array—the object's boundary—is also saved for it. The belonging of pixels to the corresponding objects 1200 is saved inside the motion map. The zones of interest 120 are created around the moving objects. In these zones, the search for the objects of specified type will be performed.

Figure 4:
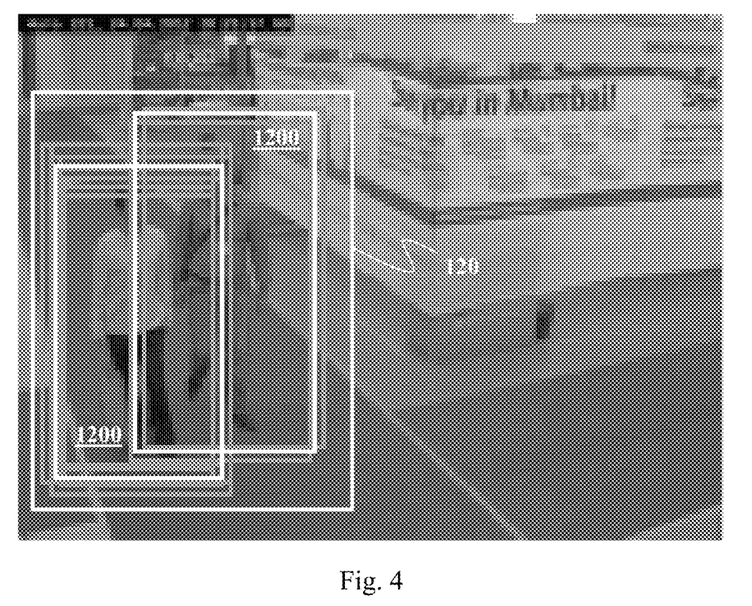
FIG. 4 depicts the sample of selecting an object in the frame with the help of the classifier.

FIG. 4 illustrates the principle of classification of the object images in the frame according to the stage 103 of the claimed method 100. The classification of the objects 1200 in the image is performed by applying the algorithm called classifier to every frame. The classifier takes a part of the frame from the zone of interest 120 at its input and gives a response whether that part of the frame contains the object image 1200 of a certain class. The set of classes is set beforehand, for example: a person, a vehicle, a tree, a post, a dog, etc. The zones of operation of the classifier are selected and saved on the frame. The classifier locates the zones of the frame which contain the image of the object 1200 of a certain class, for example, the image of a person.

The classification is performed by applying the classifier to the zones of interest 120 of the image. Each of the classifiers determines the class of the object residing in the image zone being processed. The classifier returns the index of the class to which the object belongs, or the indication that the image cannot be classified, i.e. assigned to one of the known classes (refusal to classify). The classifier can be applied to different image scales in order to ensure classification of the objects independently of their size. The application is performed with the help of a sliding window technique, with the window being moved with the predefined step. The scalability of the classifier can be additionally restricted from the top and/or from the bottom by the algorithm's settings in order to accelerate its operation. The result of using the "Person" type classifier is shown on FIG. 4. As a rule, the classifier gives many responses around each of the objects 1200, from which one response is to be chosen for each object 1200. It is done by means of applying the response frame grouping algorithm that includes the clustering technique.

If during the classification stage the object images not belonging to any known class are discovered, they will be considered as unknown objects.

Further at stage 104, the processing of all the determined Object 1200 images is performed in one or more of the zones of interest 120. According to FIG. 5, for the subsequent analysis of the object's color characteristics the image within the zone 120 selected by the classifier is divided in two parts: the foreground with the image of the object itself, and the background. At the stage of separating the background, the algorithm is used which qualifies each pixel of the selected zone 120 either as the foreground (object) or as a background using a priori knowledge about the type of objects 1200 of the given class. This stage allows to separate the sought object images from the background more precisely, which reduces the amount of noisy data and allows to increase the data processing speed and the precision of defining the relevant object image.

After background separation at stage 105, the topology is created for each of the objects 1200 discovered in the zones of interest 120. Selection of the parts of the image relating to the inherent significant structural parts of the object is an important stage of indexing of the objects 1200. For example, a person has a head, arms, legs, and a trunk. Consequently, as a rule, on the image of a person there will be areas belonging to these structural elements. These elements can also be absent, for example, due to the overlapping with other objects, covered with clothes, etc. Finding and saving the information about such areas allows to create a more representational structure of the spatial and color characteristics of the object 1200. The knowledge of the general structure of the object of a specific class is a priori, while the actual boundaries of zones 140 belonging to the particular parts of the object 1200 are determined for each specific object 1200 individually. In the course of creating the topology, the actual layout of the elements that can be relegated to a certain part of the object 1200 is considered. To do that, the algorithm for fitting boundaries between the parts of object 1200 optimally separating the areas of different colors can be used. The result of creation of the topology is presented on FIG. 5 where the boundaries of areas 140 are shown, containing a certain part of the image of a person, for example, the trunk and the legs.

Figure 5:
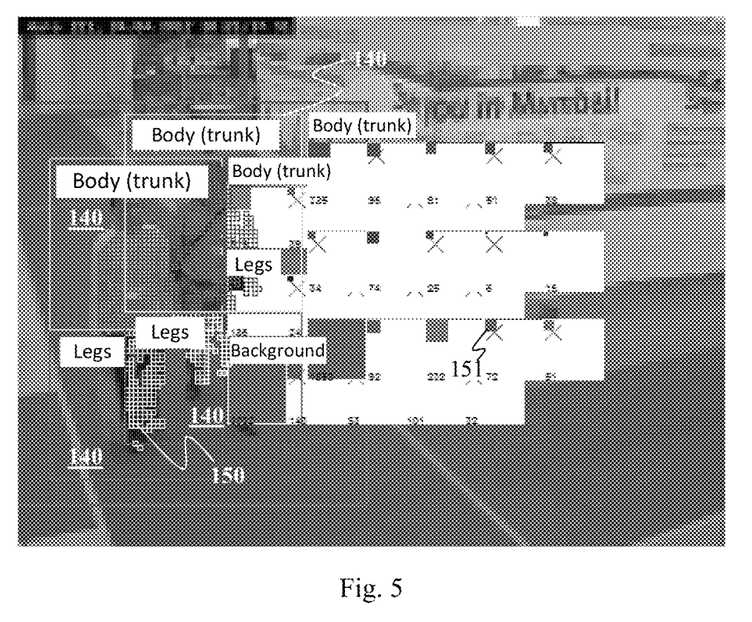
FIG. 5 shows the sample of a frame with the display of topology of the object and selection of color clusters.

According to FIG. 1, at stage 106 the set of features is created for one or more object 1200 images in accordance with the created topology. The image of the object 1200 separated from the background and divided into the structural parts according to the set topology undergoes indexing. The obtained sets of features for each object 1200 images are stored in the data storage 150 with reference to a specific mentioned object 1200 image. At this stage, a description of objects 1200 is created and can be used for comparing objects using the degree of similarity. This degree functions as follows: if the objects are not similar, the distance between them in the context of their parameters must be bigger than between the similar objects. In the proposed method, the spatial and color characteristics called color clusters can be chosen as features. They describe spatial areas of the image with homogeneous color specifications which, as a rule, correspond with the characteristic elements of the object, for example, with the individual clothing articles of a person. Each color cluster 150 can include the following attributes: position of the center in relation to the object, size in relation to the size of the whole object 1200, average color, part of object 1200 to which it belongs. On each object, a set of clusters 150 is determined for each of its parts. After that, the created preliminary set of clusters will undergo transformations that include the operations of uniting the similar clusters and rejecting the redundant (noise, background) clusters 150. FIG. 5 shows the complete preliminary sets of clusters; those rejected are highlighted 151. The assembly of the obtained color clusters of the object 150, its size, position in the frame and the time of observation form a set of features using which the objects 1200 can be intercompared. This set of features is called the index of the object 1200, and the object 1200 to which the index is assigned is called "indexed".

The result of the comparison, in general terms, answers the following questions: 1) do we see in the given area of the given frame the same object that we seek? 2) do we see in the given area of the given frame an object similar to the one we seek? 3) do we see the object that fits the specified features in the case that only the description of features was set, and not a sample of the actual object? The features of other types may be selected for more precise description of the image objects, for example, a description of the particularities of the object's movement (trajectory, type of trajectory depending on the type of object, type of object as such (a person, a vehicle). For all the features a function is created which determines the similarity of the objects 1200.

For the unknown objects found on stage 103 of the classification, the simplified topology is created that does not take into consideration the structure of such objects, and the color clusters for such objects are assigned to those objects as to the aggregate.

At stage 107, the features of the objects received at stage 106 are stored in the data storage 150 for their subsequent use in performing search sessions, i.e. the indexed objects 1200 are passed to the memory device of the data storage 150, where they are stored in a machine-readable format, for example, as a database. At saving, the indexed objects 1200 are tied to the frames on which they were found. Whereby, the received features of each specific image of the object 1200 are tied to the corresponding object. The extraction of data regarding the indexed objects can be performed by the set time and the set channels (cameras).

Also, the indexed objects can be compared with the selected sample in real-time mode. In this case, it is not necessary to record to the storage.

At stage 108, the system user performs the generation of a search request. The sample for searching can be selected from the recorded video archive stored in data storage 150, drawn, or set in a different manner allowing to derive features from the object under method 100. When drawing the sample, the user paints or selects a color for individual parts of the object of the chosen type using the drawing tools and color selection.

When selecting a sample in the archive, two options can be provided: choosing the sample that has already been indexed, or selecting the area of the archived frame with the object, and then performing its automatic indexing.

Figure 6:
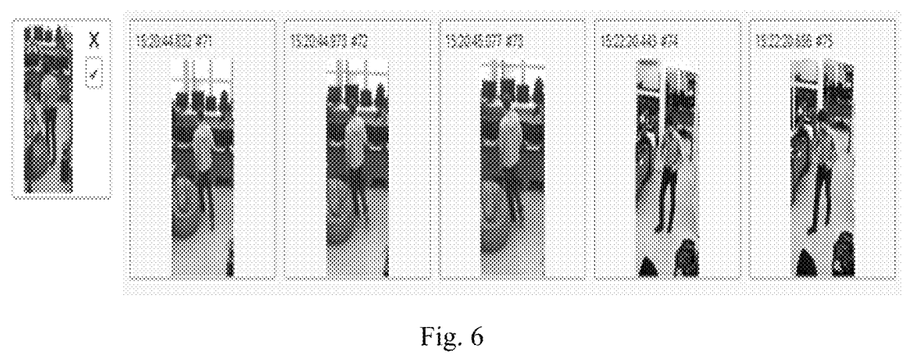
FIG. 6 shows the example of the search request result in the saved video stream data according to the set sample.

FIG. 6 shows an example of the search request when the search criterion is the image sample. This sample can be chosen by user by indicating a zone of interest 120 on the frame selected from data storage 150.

Figure 7:
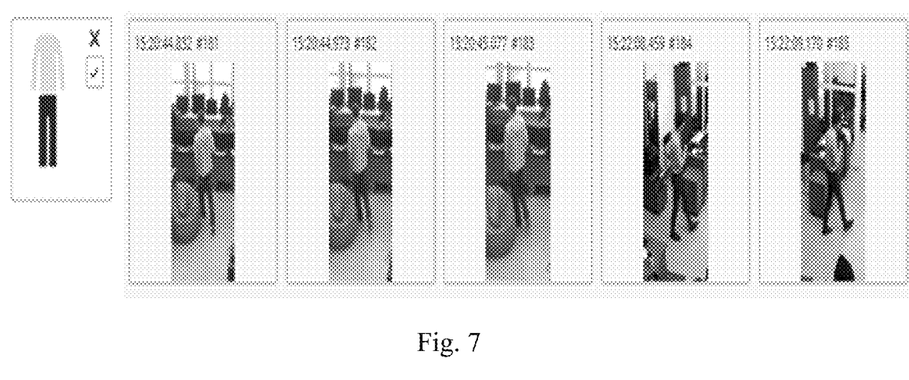
FIG. 7 depicts the example of the search request result in the saved video stream data according to the set features.

FIG. 7 illustrates an example when the search criterion is the indication of the features of the sought object, for example, light upper body clothing, dark lower body clothing, indicating specific pieces of clothing with their set of colors, for example, blue jacket, gray sweater, jeans, yellow shirt, etc.

Figure 8:
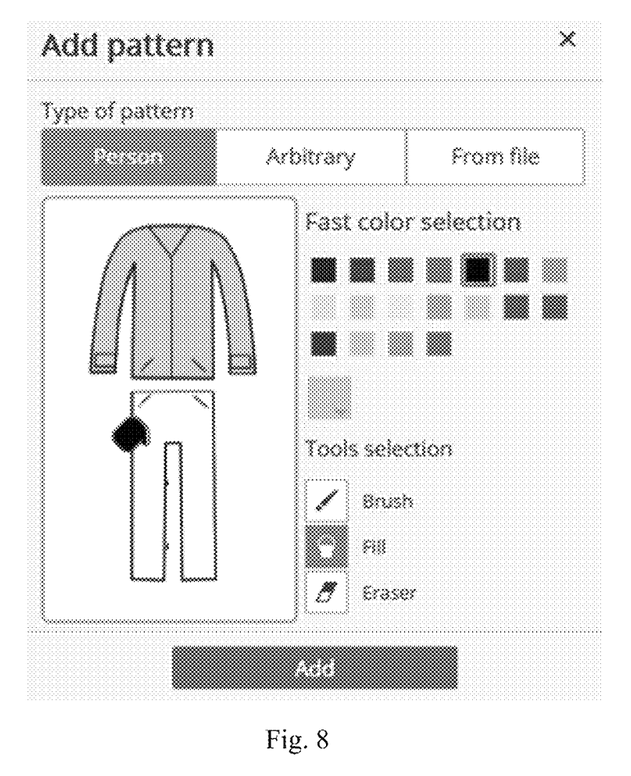
FIG. 8 illustrates the example of setting a search criterion according to sample with the help of an editor.

FIG. 8 shows a detailed type of the form for creating an object of a search. Using this automated form, the adding of a sample is performed. The form contains a set of functions allowing to set a specific type of object, color palette of clothing, a sample for searching by means of downloading an image from the archive.

Loading a sample from the file can be done by entering data to the system from an external data storage, for example, from the Internet or from an external data medium.

At stage 109, the extraction of features from the entered search criteria is performed, with creation of the search object. At this stage, the features are determined which describe the structure and/or the color clusters belonging to the image chosen as a search criterion. If the user indicated a specific class of object, for example, a person, the system immediately determines that the search in the video stream will be performed only among the objects of the similar class. If only the characteristics describing the features of the search object were specified (for example, color of clothes), the comparison will be made on the basis of the parameters describing the structure and/or color clusters and/or other features.

Stage 110 directly initiates the search procedure during which the search is performed for frames containing objects similar to the sample which was the search object at stage 111. The search for the objects similar to the given sample can be made in a simple mode or in a cross-camera tracking mode, according to the features set in advance. When searching in the cross-camera tracking mode, the spatial layout of the cameras is taken into consideration, allowing to determine when and by which camera the object was detected. In both cases, the objects stored in the data storage 150 are compared with the selected sample(s). The search is possible on all cameras connected to the system that implements the claimed method 100.

It should be pointed out that the term "cross-camera tracking mode" mentioned above relates to cross-camera tracking, i.e. to the mode of observing the object of interest using the video streams from various cameras (see, for example, http://www.osp.ru/lan/2014/06/13041879/; http://macroscop.com/o-kompanii/novosti/2013/mezhkamernyij-treking-macroscop-postroenie-traektorii-obekta-po-neskol-kim-ip-kameram-sistemyi.html).

When searching for the object image using the entered search criteria, the degree of similarity of the objects 1200 is calculated based on the features of the objects stored in data storage 150.

The degree of similarity is determined on the basis of the comparison of color clusters of the search object and the analyzed object in the frame. For each part of the object the search for pairs of closest clusters of the sample 150 and the object being checked is performed. The similarity is calculated as distance in LAB color space. Further, the degree of color mismatch and the difference of sizes of the closest clusters 150 is calculated for each part of the object. Then for the clusters 150, for which no pair was found, the mentioned degree of mismatch, which depends on their size, is established. Further, for each part of the object the maximum degree of mismatch is found, which is a degree of the objects' similarity.

Figure 9:
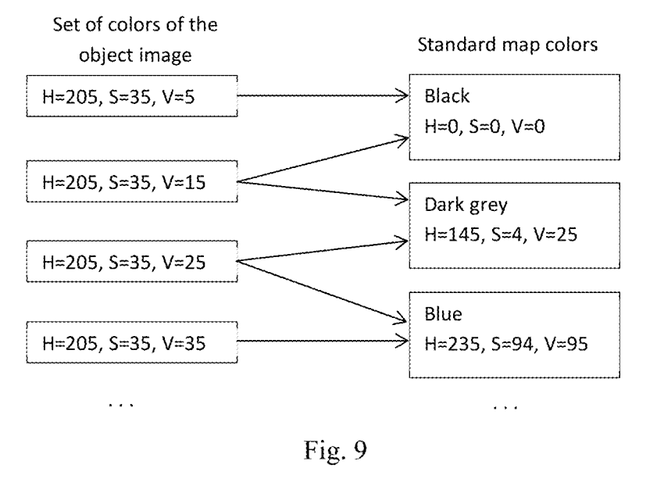
FIG. 9 shows the example of color map usage.

The degree of similarity of the clusters' color is also determined thru creating a classification of the cluster's color into one or two color classes with the help of the color map shown on FIG. 9. Color map is a finite set of the so-called primary colors. The color of the object image cluster is assigned to one or more colors of the map. The color map is an HSV color space divided in 10×10×10 cells. Each cell is assigned several (from 1 to 4) primary colors.

The criterion of similarity of an object in the course of comparing it with the sample is the presence of similar color clusters 150 in each part of the object 1200. On the pattern and on the image of the object being checked, only those color clusters are selected for comparing, the size of which is no smaller than the set part (~0.33) of the maximum in the same part of the object.

The clusters are considered possessing high degree of similarity if:
 a) there are equal colors among the primary ones assigned to them in the color map;
 b) The components of the vector in CIE Lab color space from the sample's average color to the color of the given cluster are codirectional and not small, or both small.

The object is considered to be similar if all the clusters of the pattern are found on the image of the object being checked.

When performing the search, the special search index in the form of a graph may be used to accelerate extraction of images from the relational database (data storage 150). This method of search acceleration is universally applicable for any relational database management systems and any objects between which it is possible to create a degree of similarity. Each indexed object 1200 is put into a special structure (graph), getting into the existing node, or creating a new one, depending on the proximity to the objects already put into the search graph. An identifier corresponds to each node and is written to the database together with the object. During the search, this allows to quickly extract all objects similar to the set search object. It is implemented by means of using the above-mentioned graph, due to which the identifier of the corresponding node is created. In accordance with the identifier, the extraction of all the objects with the same (similar) identifier from the database is performed.

The search can be performed by the set time interval on the selected cameras. Besides the time interval, one can set the boundaries of an object, its position in the frame, and color features. The color features are set selecting one or more samples. In the process of searching, all the objects falling within the indicated period of time are extracted from the database.

On stage 112 the system returns the result of the search which gives the user a frame or an assemblage of frames containing the mentioned object images (stage 113) corresponding to the search object, or report that the search produced no results (stage 114).

The search result is presented normally as an assembly of separate frames on which the object was found, or contains an assemblage of frames, for example, a video clip recorded by a surveillance camera. Each found frame or video clip may contain additional information, for example, frame (video clip) creation time, number of the camera from which the image was received, camera coordinates.

Figure 10:
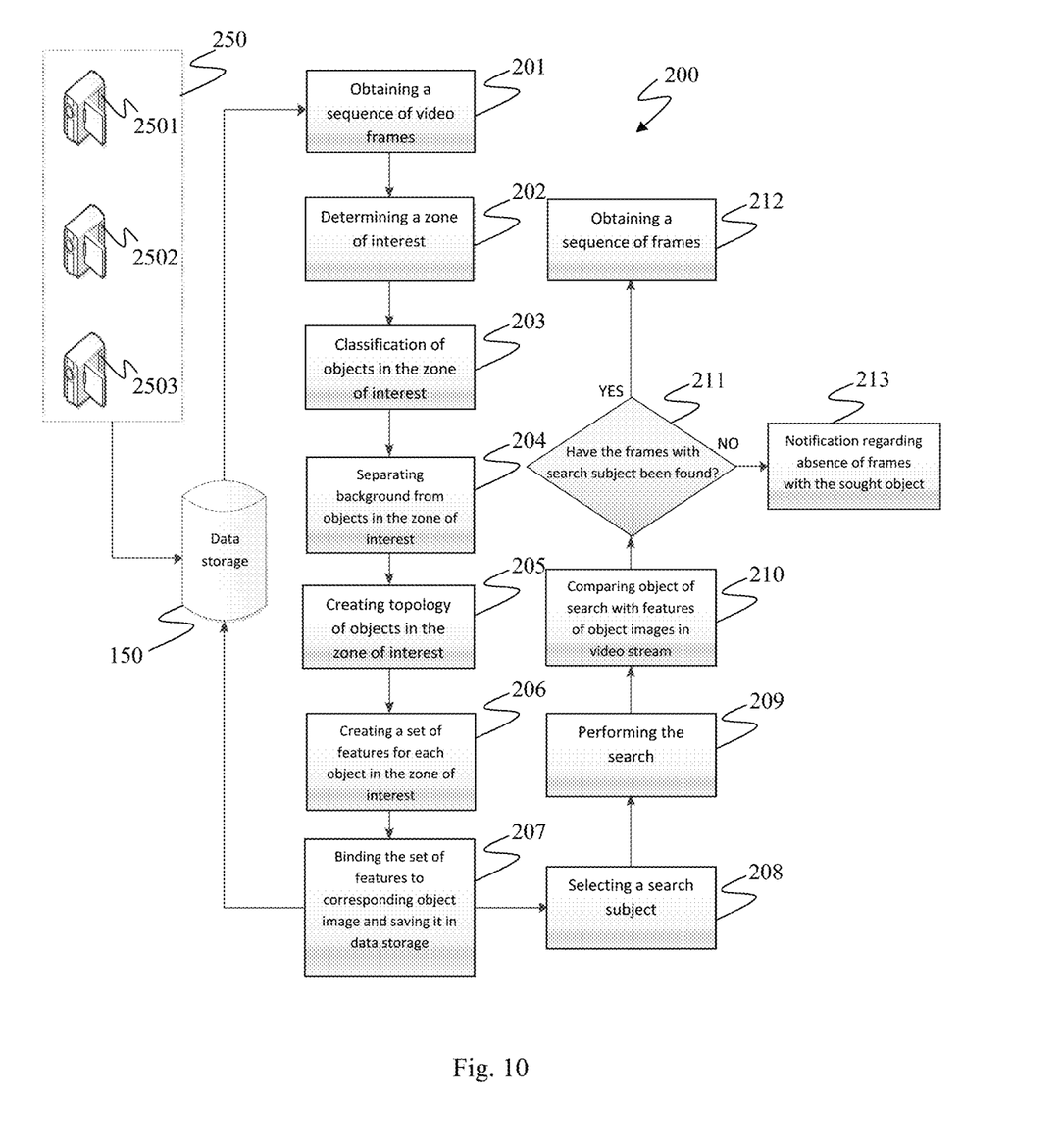
FIG. 10 shows the step sequence of implementing the method according to the second implementation option.

According to FIG. 10, the second variant of performing the object detection in the video stream 200 involves exercising observation of the object under surveillance by obtaining the information from several video surveillance cameras.

At stage 201, the sequence of frames is received from the group of cameras 250, containing several cameras 2501-2503 connected with data storage 150.

At stage 202 the user selects the zone of interest that may contain the targeted object of surveillance. The stages 203-207 are identical to the stages 102-107 of the method 100.

In case of using method 200, a specific object image in the frame, for example, a person who is set as a search object at stage 208, serves as a search object.

At stage 209 the search for the object is performed in the same way as the similar search at stages 110-111 of method 100.

If the object is found in the field of view of cameras 2501-2503, the user is provided with the sequence of frames displayed by one or more cameras that registered the image of the search object.

In case of additional indication of spatial layout of cameras, the search can be performed in the cross-camera tracking mode. Cross-camera tracking function allows the user to track an object's (for example, a person's) movements among several cameras within a certain period of time. The results of the function's operation which demonstrate the movement of a person within the fields of view of the cameras on which the person was detected can be displayed as a set of frames, a video clip, or a trajectory on a plan of premises or territory. To make the visualization of a trajectory possible, the cameras must be "tied" to the plans, i.e. it must be indicated to which point of a specific plan the location of a given camera corresponds. This mode is called semi-automatic. To achieve the required result, the approach is used when the obtained result is defined more precisely by determining which of the found objects really corresponds to the person who was selected as a sample, or, vice versa, which objects do not correspond to it. The further detailed results may be used in the next search iteration.

The choice of a search object at stage 208 can be made by indicating the zone of interest on the frame containing the object of interest received from the surveillance camera. The object is selected with the help of the graphical user interface of the system.

When obtaining the result of tracking at stage 212 during the movement of the object from the field of view of one camera and its appearance in the field of view of the other there happens the automatic switching of the image received from the cameras in order to avoid disappearance of the search object from the field of view.

When the information about the movement of the search object is visualized on the plan, the video surveillance cameras connected to the system also appear on it. Additionally, the schematic field of view of the cameras on the plan with indication of at least one camera from which the image is being received can also be shown.

The system presented in the third option constitutes a computing device (particularly, a computer) that contains one or more processors and a memory unit with processor-executed instructions which implement method 100 of searching for an object in a video stream.

The system presented in the fourth variant is a computing device (particularly, a computer), that contains one or more processors and a memory unit with processor-executed instructions which implement method 200 of searching for an object in a video stream.

Data storage 150 that forms a part of the systems of the third and the fourth implementation variants may constitute a cloud storage and may connect with the surveillance cameras from which the set of video frames is received by means of the wired or wireless communications (IP cameras with Wi-Fi transceivers).

The invention claimed is:
1. A method for searching for an object in a video stream, comprising the following steps:
  obtaining a sequence of video frames;
  determining at least one zone of interest on at least one of the video frames, provided that said zone of interest contains at least one image of the object;
  determining one or more images of the object on said zone of interest and performing their classification, where during said classification a matching is performed of one or more identified object images in the frame with at least one preset object class;
  determining classes of objects that are present in said zone of interest;
  performing processing of all the identified object images in said zone of interest, during which the identified object images are separated from the background of the frame;
  creating a topology of one or more identified object images in said zone of interest, wherein the topology includes elements characterizing the object's structure and features of such elements, representing spatial and color characteristics, which are color clusters; concurrently, each color cluster includes one or more attributes selected from the group: position of the center in relation to the object, size of the cluster in relation to the object as a whole, average color, part of the object to which the cluster corresponds, or all the attributes together;
  creating a feature set for each of the mentioned object images according to the created topology, and saving the feature set to the data storage with a reference to the specific mentioned object image;

setting a search criterion, containing information about one or more characteristics of the object, or a graphic representation of a sample for searching the object;

obtaining features of the object from said search criterion, and creating a search subject on the basis of the said features;

performing a search for objects in the video stream on the basis of the said features that characterize the object, the features obtained from the search criterion;

matching the mentioned search subject with the features of the images of the objects found in the video stream;

determining the frame and/or the set of frames containing the mentioned images of the objects that correspond to the search subject, or indicating that the search produced no results;

providing search results.

2. The method according to claim 1, wherein the sequence of video frames is received from the data storage or from one or more cameras in a surveillance mode.

3. The method according to claim 2, wherein the zone of interest is set manually by a user, or is created when there is a movement in the frame.

4. The method according to claim 3, wherein in the presence of a movement in the frame the zone of interest is created for each moving object in the frame.

5. The method according to claim 1, wherein the procedure of separating the image from the background includes dividing an area of the image into the groups of pixels which belong to the image of the object being processed and to the background.

6. The method according to claim 1, wherein the groups of pixels belonging to the background are not considered when building clusters.

7. The method according to claim 6, wherein the clusters are determined for each part of the object's structure.

8. The method according to claim 1, wherein the information contained in the search criterion includes the following: color of the object or of its part.

9. The method according to claim 1, wherein the selection of the object's image as a sample for search criterion is performed by selecting an area in the frame.

10. The method according to claim 1, wherein the object image is selected from an external data storage to be used as a sample in the capacity of a search criterion.

11. The method according to claim 1, wherein in the course of the search for the object's image according to the entered search criteria the degree of similarity of the objects is calculated based in the features of the objects contained in the data storage.

12. The method according to claim 11, wherein the degree of similarity is determined by comparing color clusters of the search object and the analyzed object in the frame; wherein the degree of similarity of the clusters' color is determined with the help of classification of the cluster's color into one or several color classes.

13. A method for searching for an object in a video stream, comprising the following steps:

obtaining a sequence of video frames from two or more cameras;

determining at least one zone of interest on at least one of the video frames, provided that said zone of interest contains at least one image of the object;

determining one or more images of the object on said zone of interest and performing their classification, where during said classification a matching is performed of one or more identified object images in the frame with at least one preset object class;

determining classes of objects that are present in said zone of interest;

performing processing of all the identified object images in said zone of interest, during which the identified object images are separated from the background of the frame;

creating a topology of one or more identified object images in said zone of interest, wherein the topology includes elements characterizing the object's structure and features of such elements, representing spatial and color characteristics, which are color clusters; concurrently, each color cluster includes one or more attributes selected from the group: position of the center in relation to the object, size of the cluster in relation to the object as a whole, average color, part of the object to which the cluster corresponds, or all the attributes together;

creating a feature set for each of the mentioned object images according to the created topology for each object, and saving the feature set to the data storage with a reference to the specific mentioned object image;

choosing the object image is as a object for tracking;

performing a search according to the mentioned video frame sequence in order to locate frames that contain said images of the object for tracking by comparing the features of the image of the object for tracking with the features of object images kept in the specified data storage;

determining the sequence of frames containing the images of the specified object;

displaying a result of the search.

14. The method according to claim 13, wherein at least one camera that detected the image of the tracked object is additionally determined.

15. The method according to claim 13, wherein the object's movement trajectory is determined and displayed on a site plan.

16. The method according to claim 13, wherein the spatial arrangement of the cameras is taken into consideration in the course of searching for the tracked object.

17. The method according to claim 13, wherein the user can set a sample as the object of tracking by selecting the object in the field of view of the camera;

wherein the automatic changeover of cameras is performed to display the image of the tracked object.

18. A system for searching for an object in a video stream, comprising at least one means for storing and processing video frames, connected with at least one processor and one data storage device, wherein said data storage device stores machine-readable commands that upon execution by at least one processor implement the steps of the following method:

receiving a sequence of video frames from the storing and processing video frames means;

determining at least one zone of interest on at least one of the video frames, provided that said zone of interest contains at least one image of the object;

determining one or more images of the object on said zone of interest and performing their classification, where during said classification a matching is performed of one or more identified object images in the frame with at least one preset object class;

determining classes of objects that are present in said zone of interest;

performing processing of all the identified object images in said zone of interest, during which the identified object images are separated from the background of the frame;

creating a topology of one or more identified object images in said zone of interest, wherein the topology includes elements characterizing the object's structure and features of such elements, representing spatial and color characteristics, which are color clusters; concurrently, each color cluster includes one or more attributes selected from the group: position of the center in relation to the object, size of the cluster in relation to the object as a whole, average color, part of the object to which the cluster corresponds, or all the attributes together;

creating a feature set for each of the mentioned object images according to the created topology, and saving the feature set to the data storage with a reference to the specific mentioned object image;

setting a search criterion, containing information about one or more characteristics of the object, or a graphic representation of a sample for searching the object;

obtaining features of the object from said search criterion, and creating a search subject on the basis of the said features;

performing a search for objects in the video stream on the basis of the said features that characterize the object, the features obtained from the search criterion;

matching the mentioned search subject with the features of the images of the objects found in the video stream;

determining the frame and/or the set of frames containing the mentioned images of the objects that correspond to the search subject, or indicating that the search produced no results;

providing search results.

19. The system according to claim 18, wherein at least one storage and video frame processing means connected with at least one surveillance camera.

20. A system for searching for an object in a video stream, comprising a group of surveillance cameras, linked with at least one means for storing and processing video frames, connected with at least one processor and one data storage device, wherein said data storage device stores machine-readable commands that upon execution by at least one processor implement the steps of the following method:

obtaining a sequence of video frames from two or more video cameras;

determining at least one zone of interest on at least one of the video frames, provided that said zone of interest contains at least one image of the object;

determining one or more images of the object on said zone of interest and performing their classification, where during said classification a matching is performed of one or more identified object images in the frame with at least one preset object class;

determining classes of objects that are present in said zone of interest;

performing processing of all the identified object images in said zone of interest, during which the identified object images are separated from the background of the frame;

creating a topology of one or more identified object images in said zone of interest, wherein the topology includes elements characterizing the object's structure and features of such elements, representing spatial and color characteristics, which are color clusters; concurrently, each color cluster includes one or more attributes selected from the group: position of the center in relation to the object, size of the cluster in relation to the object as a whole, average color, part of the object to which the cluster corresponds, or all the attributes together;

creating a feature set for each of the mentioned object images according to the created topology for each object, and saving the feature set to the data storage with a reference to the specific mentioned object image;

choosing the object image is as a object for tracking;

performing a search according to the mentioned video frame sequence in order to locate frames that contain said images of the object for tracking by comparing the features of the image of the object for tracking with the features of object images kept in the specified data storage;

determining the sequence of frames containing the images of the specified object;

displaying a result of the search.

* * * * *